United States Patent Office 2,753,927
Patented July 10, 1956

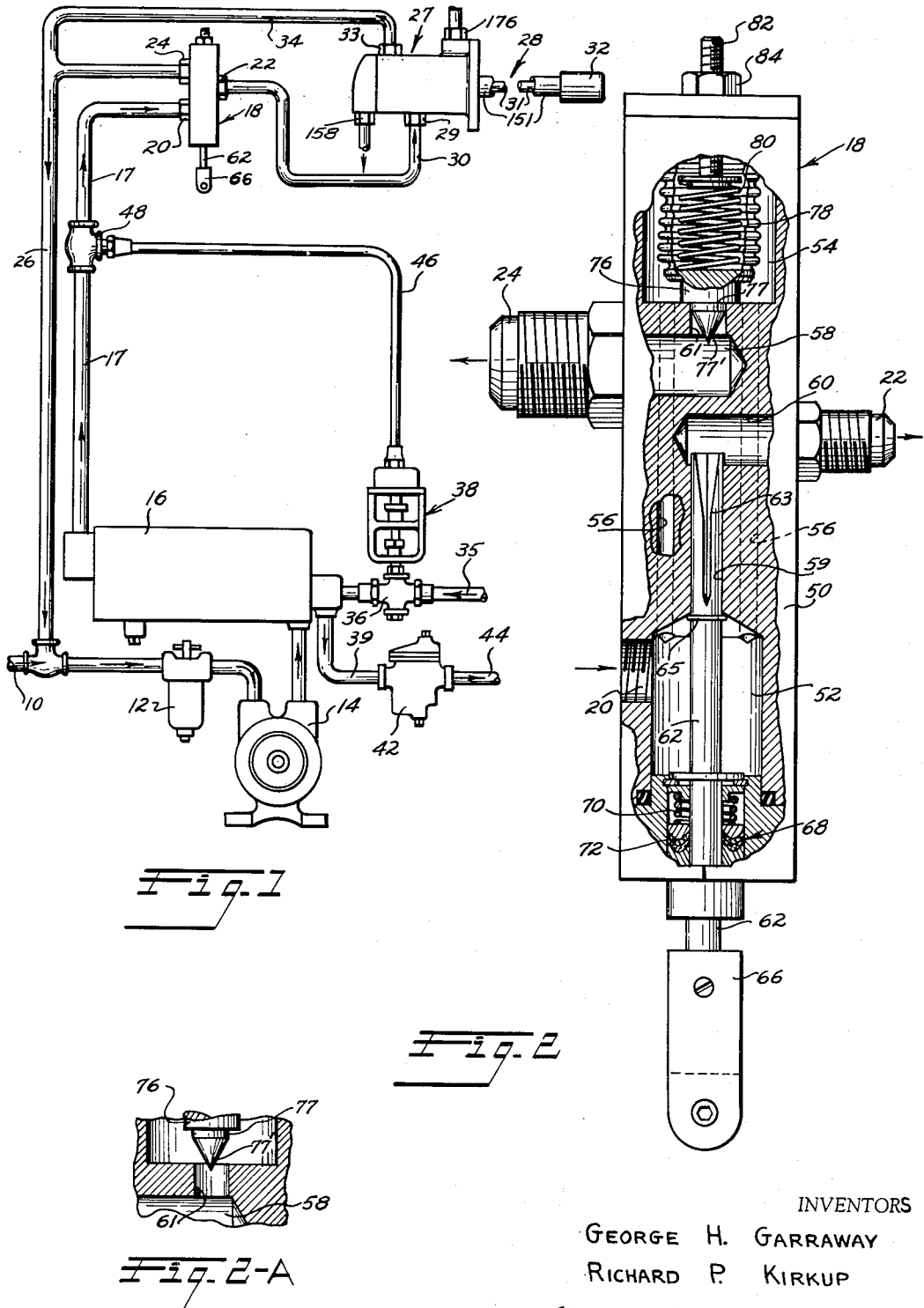

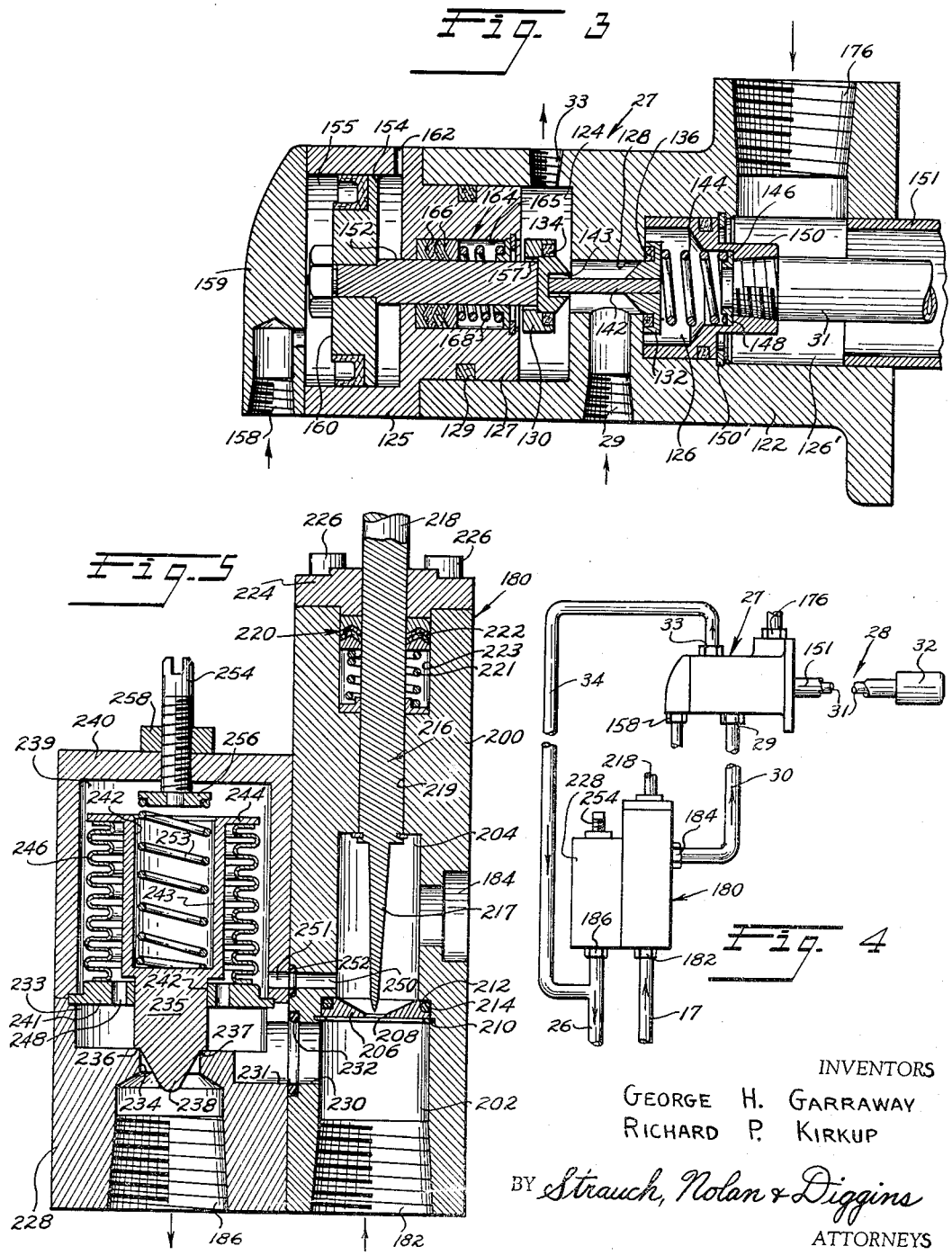

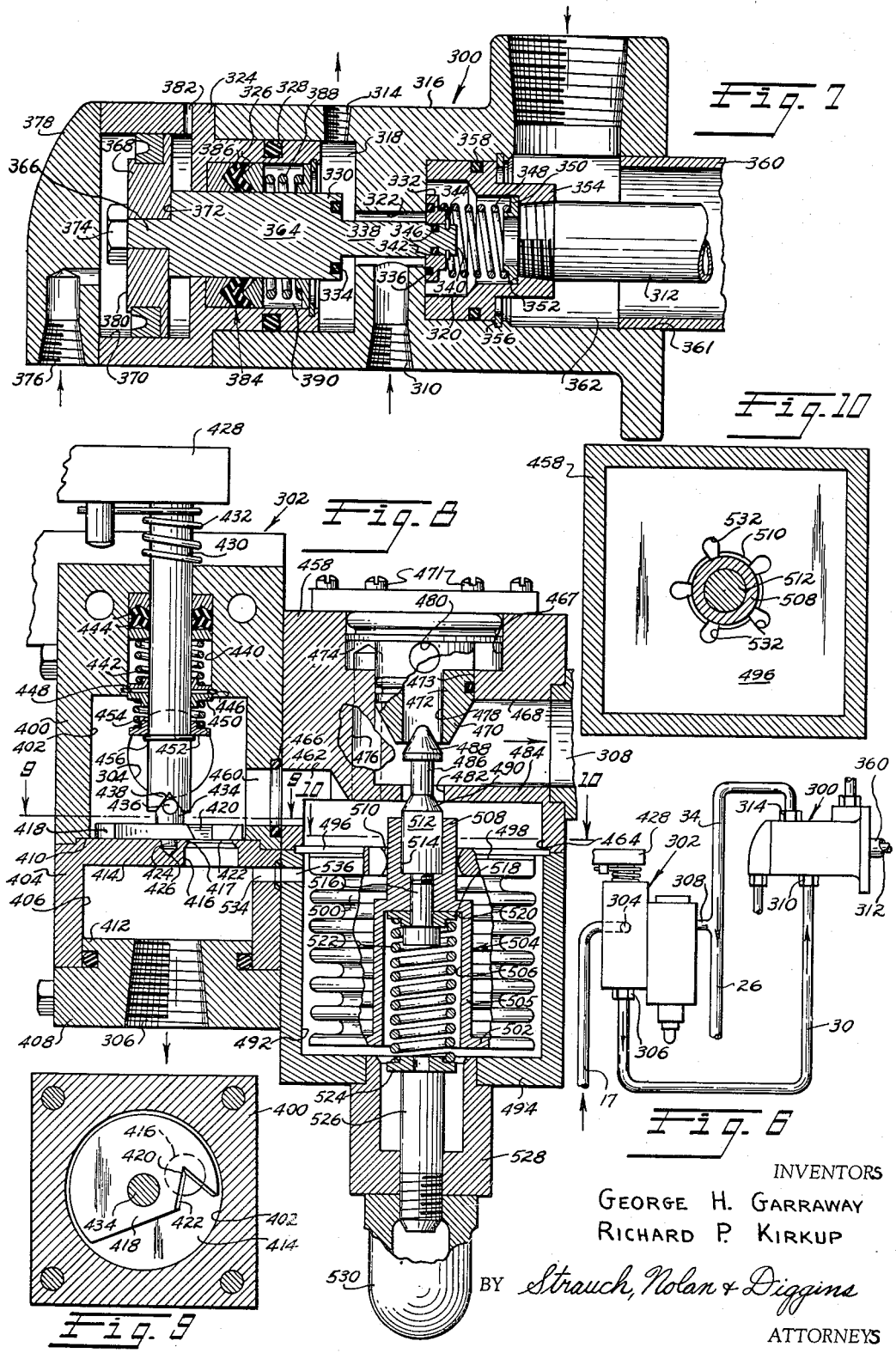

2,753,927
FUEL FLOW CONTROL

George H. Garraway, Wyomissing, and Richard P. Kirkup, Reading, Pa., assignors to Orr & Sembower, Inc., Reading, Pa., a corporation of Pennsylvania Application February 28, 1951, Serial No. 213,068

17 Claims. (Cl. 158—36.3)

This invention relates to fuel supply systems for liquid fuel burners, and more particularly to improvements in liquid fuel circulation systems in which pre-heated oil is supplied to an atomizing fuel injector and to improvements in liquid flow control valves for such systems.

It has been customary prior to this invention to supply liquid fuel, such as oil, to an atomizing fuel injector assembly from a fuel pump either directly or through an oil pre-heater, the flow of fuel to the injector assembly being controlled by a pressure regulating valve. Such pressure regulating valves are usually provided with a return outlet connected to permit recirculation of fuel to the fuel supply source, the amount of fuel flowing in the return line being usually determined by the input pressure acting on the pressure regulating valve. One example of such prior art systems is that disclosed in United States Letters Patent No. 2,000,733 for Burner Installation for Domestic Boilers, issued to E. G. Avery.

In systems of this early type, there is an exposed length of fuel supply conduit connecting the output of the pressure regulating valve to the fuel injector at the burner head. During periods of inoperation of the burner, oil in this conduit exists as a cold sluggish mass. When the burner is started, this accumulation of cold fuel in the supply conduit and even part of the pre-heated oil following it, which will be cooled by the relatively cold conduit, will be injected into the burner at a temperature below the optimum operating temperature so that it will not atomize or burn readily thus rendering starting conditions poor.

For optimum efficiency of operation, it is desirable to supply fuel to the atomizing nozzle at a constant rate, preferably at a constant weight of fuel per unit of time. In prior art systems controlled by pressure regulating valves, changes in viscosity of the oil resulting from the natural swing or "hunt" of the oil temperature control mechanism controlling the oil pre-heater and the variation of oil analysis from one delivery to the next prevents the maintenance of a constant firing rate. Also in such prior art systems, variation of pressure on the discharge or nozzle side of the regulator resulting from variations in pipe friction between the valve and the nozzle, changes in viscosity, collection of carbon or dirt particles in the oil port of the nozzle, and minute differences in the size of the oil ports in the nozzles of nominally identical size changed in the field, and changes in the air pressure supplied for fuel atomization resulting from carbon or dirt particles in the air flow passages in the nozzle, fading of the compressor, replacement of the compressor, and minute differences in the size of the air flow passages in the nozzle between nominally identical nozzles, both produce undesirable variations in the fuel firing rate. The fuel firing rate will also vary in such prior art systems with different grades of fuel oil used.

It is accordingly the primary object of this invention to overcome these disadvantages of prior art systems by providing an improved fuel supply system for a liquid fuel burner wherein fuel recirculating means are provided for supplying pre-heated fluid fuel directly to the injector upon the initiation of combustion to prevent the injection of cold fuel into the combustion chamber.

It is an equally important object of this invention to overcome the disadvantages of such prior art systems by providing an improved fuel supply system for a liquid fuel burner wherein means are provided for maintaining the rate of fuel flow to the fuel injector substantially constant over a wide range of variations of operating conditions.

It is a further object of this invention to provide an improved fluid fuel injector assembly having a fuel flow control valve as a part thereof.

A further object of this invention is to provide a novel fuel supply system wherein pre-heated fuel is supplied directly to a fuel injector assembly for heating the assembly itself whereby fuel at operating temperature may be supplied to the injector assembly immediately upon initiation of burner operation.

A further important object of this invention is to provide a fuel flow control valve of novel construction adapted to maintain a rate of fuel flow therethrough substantially constant over wide ranges of variation of operation conditions.

These and other objects of this invention will become apparent as the description proceeds in connection with the accompanying drawings wherein like reference numerals have been used to designate like parts and wherein:

Figure 1 is a diagrammatic view of an improved fuel circulating system wherein the improved fuel injector assembly is combined with a constant pressure control valve for supplying pre-heated fuel at operating temperature immediately upon initiation of operation;

Figure 2 is a partially sectional view of the constant pressure valve of the circulating system of Figure 1;

Figure 2A is a fragmentary sectional view illustrating the valve of Figure 2 in its partially opened position;

Figure 3 is a sectional view of the fuel recirculating control valve of the fuel subjector assembly of the system of Figure 1;

Figure 4 is a diagrammatic view of a fuel circulating system such as that of Figure 1 modified by the inclusion of one form of a constant flow valve;

Figure 5 is a sectional view of the constant flow valve of the fuel circulating system of Figure 4;

Figure 6 is a diagrammatic view of a fuel circulating system constituting a further and preferred modification of that of Figure 1;

Figure 7 is a sectional view of the preferred form of fuel recirculating control valve of the fuel injector assembly of the system of Figure 6;

Figure 8 is a sectional view of the preferred form of the constant flow valve, being that of the fuel circulating system of Figure 6;

Figure 9 is a sectional view of the preferred form of constant flow valve taken along the line 9—9 of Figure 8; and Figure 10 is a further sectional view of the preferred form of constant flow valve taken along the line 10—10 of Figure 8.

Referring now to the fuel circulating system of Figure 1, oil is supplied to this system from an inlet conduit 10 through an oil strainer 12 to an oil pump 14. Oil pump 14 forces oil through an oil preheater 16 and thence through conduit 17 to a constant pressure valve 18 which is provided with an inlet connection 20, an outlet connection 22 to the burner, and a return outlet connection 24 for recirculation. A return conduit 26 is connected between outlet 24 and conduit 10. An oil recirculation valve 27, which will be described in detail later, is mounted as a novel end adapter of the oil injector assembly 28 and is provided with a fuel inlet 29 connected by conduit 30 to outlet 22 of constant pressure valve 18, a fuel conducting tube 31 leading directly to the nozzle 32 of the fuel injector assembly 28, and a fuel return outlet 33 suitably connected through conduit 34 to the fuel return line 26.

The temperature of the oil supplied to the constant pressure valve 18 through inlet 20 is controlled at the oil preheater 16 which is a heat exchanger unit of generally conventional design. In the preheater here disclosed, steam is supplied from an inlet 35 through a valve 36 actuated by a regulator 38. Steam condensate is removed from the oil preheater 16 through pipe 39, steam trap 42, and pipe 44. Regulator 38 is connected through cable 46 to a thermal responsive element within coupling 48 in line 17 so that the supply oil temperature controls the degree of oil preheat. Due to the lag in this control, the supply oil temperature will fluctuate about an established operating norm.

The structural details of the constant pressure valve 18 are illustrated in Figure 2. The body 50 of this constant pressure valve 18 is formed with two chambers 52 and 54 interconnected by a series of longitudinal passages 56. Oil inlet connection 20 opens directly into chamber 52. Two outlet chambers 58 and 60 are formed within the body structure 50 intermediate the chambers 52 and 54. A bore 59 connects chambers 52 and 60, and a bore 61 connects chambers 54 and 58. A valve stem 62, having at least one longitudinally extending groove 63 of changing size formed on its outer surface, is mounted for axial sliding movement in bore 59. Valve stem 62 is shown in Figure 2 in its closed position, that is with groove 63 out of communication with inlet chamber 52 and a stop ring portion 65 abutting against the body. As valve stem 62 is moved down through bore 59, groove 63 forms an intercommunicating channel between chambers 52 and 60 to permit passage of oil from inlet 20 to outlet 22 and the burner. Since the size of groove 63 varies along its length, the quantity of oil flow can be accurately controlled by the longitudinal position of valve stem 62. Valve stem 62 extends below the valve assembly 18 and is connected to a clevis 66, leakage of oil along the valve stem 62 being prevented by the substantially conventional stuffing box assembly 68 including spring 70 and packing material 72. The position of valve stem 62 may be varied either manually or by any suitable conventional automatic controlling mechanism for controlling the quantity of fuel flow through outlet connection 22 to the fuel injector assembly 28.

A valve member 76 has a neck 77 and a conical tip 77' adapted to be disposed in bore 61 and actuated in response to oil pressure at the inlet 20. Its purpose is to control recirculation of oil in the system. Oil from chamber 52 passes through passages 56 into chamber 54. Valve member 76 is fixed to the movable end of a pressure control bellows 78 and may be adjustably preloaded by a spring 80 therein. The preloading adjustment of the valve 76 is controlled by the manipulation of screw 82 to vary the initial compression of spring 80 and a lock nut 84 to hold the adjustment.

In operation, this constant pressure valve 18 is effective to vary the rate of flow through the return outlet connection 24 to maintain the oil inlet pressure within chamber 52 substantially constant regardless of the selected or set position of the valve stem 62. When oil circulation starts the oil pressure built up in chamber 54 eventually overcomes the resistance of bellows 78 and spring 80 to raise valve neck 77 out of bore 61 and permit flow of oil through bore 61, chamber 58 and outlet return connection 24 (see Figure 2-A). A stable condition is soon reached for a given pump pressure corresponding to desired oil pressure in chamber 52 which results in a certain throttling position of conical tip 77' in bore 61.

Suppose the oil pressure in chamber 52 increases and undesirably tends to increase the flow of oil through burner outlet 22. The pressure increase is transmitted through passages 56 to chamber 54 to further collapse bellows 78 and further open bore 61 to increase the flow of oil into chamber 58, thereby effectively reducing the oil pressure in chambers 54 and 52 until the desired oil feed pressure is restored in chamber 52. The same but opposite action takes place when the oil pressure in chamber 52 becomes reduced.

The structure of oil circulating valve 27 is shown in detail in Figure 3. Valve 27 has a body 122 preferably of metal formed with chambers 124 and 126 interconnected by a bore 128. Chamber 124 is closed at its rear end by a metal cap 125 having a portion 127 snugly pressed into chamber 124, and a seal ring 129 prevents oil leakage. Oil inlet 29 opens centrally into bore 128. The return outlet 33 opens directly into chamber 124, while the tube 31 opens directly into the chamber 126 and is conveniently coaxially aligned with bore 128.

Valve structure is provided for alternatively providing oil inlet flow through bore 128 into either chamber 124 or chamber 126. This valve structure comprises a pair of oppositely facing valve members 130 and 132 having annular sealing elements 134 and 136 adapted for seating engagement respectively with the opposite ends of the bore 128. A valve stem 142 is fixed at one end to valve member 132 and loosely engages at its opposite end a recess 143 formed within the valve member 130. A compression spring 144, abutting at one end against valve member 132, abuts at its opposite end against a ring 146 bearing against a shoulder 148 of an internally threaded outlet connection member 150 which is fixed within the body structure 122 as by snap ring 150'. The threaded end of oil tube 31 is fixed in member 150 and a concentric surrounding air tube 151 has its outer end fixed in an aperture in the wall of chamber 126'. Spring 144 maintains the valve member 132 in position to normally close the passage of oil from the inlet 29 to the nozzle pipe 31.

A piston rod 152 is fixed at one end to a piston 154 slidable in a cylinder 155 in cap 125, and its other end engages a recess 157 formed within the back of valve 130 opposite recess 143. A compressed air inlet port 158 is provided through end wall member 159, which is suitably fixed to cap 125 by means not shown, for admitting compressed air to act against the rear face 160 of the piston 154, an exhaust port 162 being provided to permit egress and ingress of air from and into the cylinder on the forward side of piston 154. A suitable stuffing box assembly 164 having packing elements 166 and a compression spring 168 is provided in a cap recess 165 surrounding piston rod 152 to prevent leakage of oil along the piston rod.

In Figure 3, the valve is shown in such position that passage to the tube 31 from the inlet 29 is closed while that from inlet 29 to return outlet 33 is open. This is the normal condition when the burner is not operating. In this position, and with preheated oil entering inlet 29, there is recirculation in the system through bore 128, chamber 124, outlet 33 and conduits 34 and 26. This circulation of hot oil through body 122 soon heats up that body to about the temperature of the oil and all of the associated metal parts are so warmed by conduction of heat.

The atomizing oil injector assembly 28 comprises tube 151 and nozzle oil tube 31 concentrically positioned therein, and nozzle 32. Compressed air or steam is supplied to chamber 126' and tube 151 through an inlet 176. The primary function of this air or steam is to atomize the oil at the burner nozzle 32. This atomizing air or steam is hot so that while it passes along tube 151 surrounding oil tube 31 it heats the oil lying in tube 31 and the nozzle 32.

Thus, in this phase of the invention, I insure that the oil in the entire system is heated and ready for atomization immediately upon entry into and within the burner and there is no cold slug of oil entering the combustion chamber when the valve is opened to admit oil to tube 31. Upon the application of air pressure to the surface 160 of the piston 154 through the air inlet 158, which is effected by a burner starter control, the piston 154 and valve assembly will be shifted to the right in Figure 5 to close the passage from oil inlet 29 to return outlet 33 and to open the passage from oil inlet 29 to oil tube 31 to feed oil into the burner nozzle.

In the above described construction I have provided an arrangement whereby the preheated oil heats up the entire line right up to the point of entry of oil into the burner head, and there is no cold oil in the system. The procedure is to warm up the system for a short period by recirculation of heated oil and by circulation of the hot compressed air or steam through the nozzle, so that the burner will start efficient firing immediately when the oil is sprayed into the combustion chamber and ignited. The metal mass of body 122 retains heat and there is no exposed cool section of oil conduit in the system.

A modified oil circulating system is disclosed in Figure 4. In this modification, one form of a constant flow valve assembly 180 is substituted for the constant pressure valve 18 of the modification of Figure 1.

Constant flow valve assembly 180 is provided with an oil inlet 182, a burner outlet 184, and a return outlet 186. As will become apparent presently, constant flow valve 180 is effective to maintain the rate of flow from inlet 182 to the burner nozzle substantially constant for any given manual or automatic setting of the valve despite relatively wide variations in oil viscosity, discharge pressure to the nozzle assembly, and variations in the grade of oil used. Inlet 182 is connected to a preheater like 16 of Figure 1.

The constant flow valve 180, the structural details of which are shown in Figure 5, supplies fuel to the oil recirculating valve assembly 27 at a substantially constant rate of flow through the conduit 30. The valve 180 comprises a first body member 200 in which the inlet 182 and the outlet 184 are formed in intercommunication respectively with internal inlet and outlet chambers 202 and 204. An annular member 206, having a circular opening 208 therethrough defining an orifice, is held in position between the two chambers 202 and 204 between a split retainer ring 210 and an annular shoulder 212 integral with body member 200. A seal ring 214 prevents oil leakage around the annular member 206. A needle valve member 216 having an elongated conical tip 217 on the end of a valve stem 218 is slidably mounted in a bore 219 within the body member 200 in coaxial alignment with the opening 208 of the annular member 206. Needle valve tip 217 and orifice 208 coact to control the quantity of oil flow through the valve 180, valve stem 218 being set or adjusted either manually or from an automatic control mechanism like stem 62 in Figure 2. Leakage of fuel along valve stem 218 is prevented by the provision of a stuffing box assembly 220 which includes a compression spring member 221 and packing material 222 surrounding the valve stem 218 and which is held within a recess 223 in the body member 200 by a cover plate 224 suitably secured to the end of the body member 200 such as by screws 226.

A second body member 228, which is rigidly secured to the first body member 200 by any suitable means (not shown), is formed with return outlet 186. Aligned bores 230 and 231 provide a by-pass between body members 200 and 228, and the joint is sealed by ring 232. Bore 231 opens into a chamber 233 in body 228 and a bore 234 connects chamber 233 with return outlet 186. A valve member 235 is formed with an annular face 236 for coaction with a valve seat 237 formed at the end of bore 234 for throttling flow of oil through this by-pass to the return outlet 186. Valve member 235 has a conical tip 238 which projects into bore 234 and is positioned therein to throttle the oil flow.

The position of the valve member 235 with respect to bore 234 is controlled by a suitable differential pressure responsive device connected to the opposite sides of the annular orifice defining member 206 for actuation in response to changes in the differential pressure across the orifice defined by the opening 208. In its preferred form, the differential pressure responsive device is a built-in part of the constant flow valve assembly and is of the type known as a sylphon unit. A pressure chamber 239 is formed by a housing 240 secured to body 228 by a suitable means which clamps a plate 241 therebetween that provides a wall between chambers 233 and 239. Valve member 235 is slidably guided in a bore 242 in plate 241, and formed above plate 241 with an internal recess 243 and an upper end flange 244.

A bellows element 246 is fixed at its opposite ends to the underside of the annular flange 244 and to the upperside of plate member 241, thus effectively sealing the pressure chamber 239 from the by-pass 230, 231. Apertures 248 provided in plate member 241 connect chamber 233 to the interior of bellows 246.

Aligned bores 250 and 251 in body 228 and housing 240 sealed by ring 252 provide a passage between chambers 204 and 239. The bellows 246 is thus externally subjected to the oil pressure existing on the outlet side of annular member 206, and is internally subjected to the oil pressure existing on the inlet side of annular member 206 and the difference in these pressures, the drop across the orifice 208, determines the position of valve 235. A compression spring 253 is mounted within recess 243 and is provided with a suitable adjustment comprising a screw 254, plate 256 and a coacting lock nut 258. Screw 254 is adjusted to provide initial compression of spring 252 to hold valve member 232 in its closed position until the desired differential pressure across the orifice 208 is attained. Thus, after the initial adjustment of screw 254, the desired quantity of flow of fluid fuel may be selected by actuation of needle valve stem 218 to move needle valve tip 217 relative to orifice 208 to change the size of the orifice, and the pressure responsive device which is responsive to the pressure drop across the orifice 208 will control the throttling position of the valve tip 238 in bore 234. Should there be an increase of flow of oil through inlet 182, there will be an increased pressure drop across orifice 208, and that increased pressure drop will become immediately effective to raise valve member 235 to open the passage through bore 234 and permit a larger amount of fuel to by-pass and return directly through return outlet 186. This reduces the amount of flow through orifice 208 and decreases the pressure drop until a balanced condition of constant flow is obtained.

The preferred embodiment of the oil circulating system is disclosed in Figure 6. In this preferred embodiment, a preferred form of oil recirculating valve 300, which is illustrated in detail in Figure 7, is mounted as an end adapter of the oil injector assembly and a constant flow valve assembly 302 which is illustrated in detail in Figures 8 to 10, is substituted in lieu of the constant pressure valve 18 of the embodiment of Figure 1 and the constant flow valve assembly 180 of the embodiment of Figure 4.

Constant flow valve assembly 302 is provided with an oil inlet 304, a burner outlet 306, and a return outlet 308. Constant flow valve 302 being of a preferred and improved construction, as will be pointed out in detail presently, is even more effective to maintain the rate of flow from inlet 304 to the burner nozzle substantially constant for any given manual or automatic setting of the valves despite relatively wide variations in oil viscosity, discharge pressure to the nozzle assembly, and grade of oil used than that disclosed in detail in Figure 5.

The oil recirculating valve 300 is provided with a fuel inlet 310 connected by conduit 30 to the outlet 306 of the constant flow valve 302, a fuel conducting tube 312 leading directly to the nozzle of the fuel injector assembly, and a fuel return outlet 314 suitably connected through conduit 34 to the fuel return line 26.

The structure of the oil recirculating valve 300, which has the same function as valve 27 of Figure 1, is shown in detail in Figure 7. Valve 300 has a body 316, preferably formed of metal, which is provided with chambers 318 and 320 interconnected by a bore 322. Chamber 318 is closed at its rear end by a metal cap 324 having a portion 326 snugly pressed into chamber 318, and a sealing ring 328 preventing oil leakage between cap 326 and member 316. Oil inlet 310 opens centrally into the bore 322. The return outlet 314 opens directly into chamber 318, while the nozzle pipe 312 opens directly into the chamber 320 and is conveniently coaxially aligned with bore 322.

Valve structure is provided for alternatively providing oil inlet flow through bore 322 into either chamber 318 or chamber 320. This valve structure comprises a pair of oppositely facing valve members 330 and 332 having respectively annular sealing elements 334 and 336 adapted for sealing engagement respectively with the opposite ends of bore 322. A valve stem 338 is formed integral with valve member 330 and is provided with an end portion 340 of reduced diameter upon which the valve member 332 is mounted in abutment with a shoulder 342 formed thereon and held in position by a split ring 344. A sealing ring 346 prevents oil leakage along the reduced portion 340 of the stem 338 past the valve member 332. A compression spring 348, abutting at one end against valve member 332 and at its opposite end against a retainer ring 350, holds valve member 332 normally closed and valve member 330 open so that oil will flow from inlet 310 to outlet 314 and not to pipe 312. Ring 350 abuts against an internal shoulder 352 of an internally threaded outlet connection member 354 which is fixed within the body structure 316 by a snap ring 356. Leakage of oil between outlet connection member 354 and the body 316 is prevented by the provision of a sealing ring 358. The adjacent end of oil tube 312 is threadedly engaged in member 354 and a concentric surrounding air tube 360 has its end fixed within an aperture 361 in the wall of chamber 362.

The piston rod 364 is formed integral with valve member 330 and valve stem 338 and at its opposite end is provided with a portion 366 of reduced diameter upon which a piston 368, slidable in a cylinder 370 formed in cap 324, is fixed in abutment with the shoulder 372 of piston rod 364 by a nut 374 threadedly engaging the outer extremity of the reduced portion 366.

A compressed air inlet port 376 is provided through a member 378, which is suitably fixed to cap 324 by means not shown to form the end wall of cylinder 370, for admitting compressed air to act against the rear face 380 of the piston 368, an exhaust port 382 being provided to permit egress and ingress of air from and into the cylinder 370 on the forward side of piston 368. A suitable stuffing box assembly 384 having packing elements 386 and a compression spring 388 is provided in cap recess 390 surrounding piston rod 364 to prevent leakage of oil therealong.

The mode of operation of the oil recirculating valve of Figure 7 is substantially the same as that of Figure 3. The improved construction of this valve results in more economical assembly and improved operation because the oppositely facing coacting valve members 330 and 332 are secured together for conjoint movement in a rigid assembly to form a balanced valve structure, the operation of which is not adversely affected by pressure variations at inlet 310.

The structural details of the preferred form of constant flow valve of Figure 6 are shown in Figures 8 to 10. The body structure of valve 302 through which oil flows from inlet 304 to outlet 306 comprises a first body member 400 provided with a recess 402, a second body member 404 also provided with a recess 406 and a cap member 408 in which the outlet 306 is formed. These three members 400, 404, and 408 are suitably secured together by means not shown to form a unitary housing structure, member 404 being provided with a shoulder 410 and member 408 being provided with a shoulder 412 whereby proper alignment of the three members is maintained. The end wall 414 of member 404 separates recess 402 from recess 406 to thus define oil inlet and outlet chambers with which inlet 304 and outlet 306 communicate respectively. An aperture 416 counterbored to form a thin edge 417 is formed through the end wall 414 of member 404 to define a orifice through which oil must flow from inlet 304 to outlet 306. A rotary valve member 418, having a V-shaped notch 420 the sides of which are suitably sloped to provide a knife edge at 422, is provided in coaction with the aperture 416 to effectively vary the size of the orifice between the inlet and outlet chambers. Valve member 418 is in surface contact with the upper surface of wall 414 of member 404 and is mounted for pivotal movement about a centrally located pivot pin 424 which extends into a recess 426 located centrally of the wall 414.

As may be seen by referenec to Figure 9, the recess 402 within body member 400 is cylindrical in shape and the valve member 418 is a sector of a circular disk. Valve member 418 being centrally pivoted within recess 402 and resting upon the upper surface of wall 414 may be rotated about its central pivot so that the aperture 416 may be completely open or closed or to any intermediate position between these two extremes. It should be noted that, the sides of the V-shaped notch 420 being sloped to form a knife edge at 422, a sharp edged orifice through which the oil flows from the inlet 304 to the outlet 306 is maintained throughout the entire control range. The contacting slide surfaces of member 418 and wall 414 are flat and smooth.

The movement of valve member 418 is controlled from a lever 428 through a valve control shaft 430, the two being rigidly connected for the transmission of rotary motion from the former to the latter. A torsion spring 432 biases the shaft with respect to a control linkage (not shown). A stem 434, fixed to the upper surface of valve member 418, extends into a recess formed within the lower end of shaft 430 and is provided with radially extending pins 436 which engage V-shaped notches 438 formed transversely across the end of shaft 430 to form a motion transmitting connection between shaft 430 and stem 434.

Shaft 430 extends through body member 400 to the exterior thereof through a recess 440 which is coaxially aligned with recess 402 and in which a compression spring 442 and packing element 444 coact to form a substantially conventional stuffing box to prevent the leakage of oil along the shaft 430. A split ring 446 is fixed within the recess 440 and supports a spring retainer member 448 to maintain the spring 442 to its compressed condition. A pair of spring retainer members 450 and 452, between which a spring 454 is compressed, coact to force the shaft 430 downward against the stem 434 to maintain the motion transmitting connections therebetween, retainer member 450 being in abutment with the ring 446, and member 452 with a ring 456 fixed to the shaft 430. Spring 454 presses member 418 oil-tight against the upper surface of the wall 414.

Lever 428 is actuated by conventional burner control mechainsm which forms no part of this invention. Through this linkage just described pivotal movement of lever 428 is effective to vary the size of the orifice between the inlet 304 and the outlet 306 to vary the rate of flow therebetween.

As in the previous embodiment of the constant flow valve shown in Figure 5, this preferred embodiment of the constant flow valve is provided with a by-pass passage or waste gate interconnecting the oil supply channel 17 with the return channel 26, the flow being from inlet 304 to outlet 308. Return outlet 308 is formed in a body member 458 which is suitably secured to the body member 400. Aligned bores 460 and 462, the former formed in member 400 in communication with the inlet chamber recess 402 and the latter formed in member 458 in communication with a control chamber recess 464 formed in member 458, provide a by-pass passage between body members 400 and 458. The joint between these members is sealed by a ring 466.

A recess 467 is formed within the upper end of member 458 and a laterally extending recess 468 defining a return outlet chamber is formed within member 458 intermediate chamber 464 and recess 467. A member 470, secured to member 458 by screws 471, closes the end of recess 467 and is provided with a portion 472 which extends through an aperture 473 formed through body member 458 interconnecting recess 467 and chamber 468. An annular chamber 474 is thus defined between portion 472 of member 470 and the side wall of recess 467. A plurality of bores 476 through the body member 458 define oil channels between control chamber 464 and the annular chamber 474. Member 470 is formed with a bore 478 through and coaxial with portion 472 extending from its end within return outlet chamber 468 and is also provided with a plurality of radially extending channels 480 extending between bore 478 and the annular chamber 474.

An aperture 482 is formed through the wall 484 which separates the control chamber 464 and the return outlet chamber 468 in coaxial alignment with bore 478. By this construction oil may flow from the inlet 304 into the inlet chamber recess 402 and through aligned bores 460 and 462 into the control chamber 464, then either through aperture 482 to the return outlet chamber 468 and the outlet 308 or through bores 476, the annular chamber 474, channels 480 and bore 478 to the outlet chamber 468 and the outlet 308.

A valve member 486 formed with spaced valve faces 488 and 490 is mounted for movement relative to aperture 482 of wall 484 and the bore 478 of member 470, the valve face 488 being adapted to engage the return outlet chamber end of bore 478 and the valve face 490 being adapted to engage the control chamber end of the aperture 482 through wall 484.

The position of valve member 486 relative to the valve seats formed by the edges of apertures 482 and 478 is controlled by a suitable differential pressure responsive device connected to the opposite sides of the orifice defined by the coaction of aperture 416 and the V-shaped notch 420 on the rotary valve member 418 for actuation in response to changes in the differential pressure across the orifice thus defined. As in the first embodiment of the constant flow valve disclosed in Figure 5, the differential pressure responsive device is a built-in part of the constant flow valve assembly. A pressure chamber 492 is defined by a housing 494 secured by suitable means not shown to member 458 and member 404. A plate 496 separating the pressure chamber 492 and the control chamber 464 is clamped between the adjacent mating edges of member 458 and housing 494.

Plate 496 is formed with a cylindrical boss 498 around which one end of a expandable bellows 500 is fixed. The opposite end of bellows 500 surrounds and is fixed to a flange portion 502 of the movable element 504 of the pressure responsive device. Movable element 504 is formed with a hollow cylindrical central portion 505 having a coaxial recess 506. On one end of central portion 505 flange 502 is integrally formed and at the opposite end thereof an end portion 508 of reduced diameter is formed. End portion 508 of movable member 504 extends through an aperture 510 formed through the center of plate 496, the wall of aperture 510 being arcuate in cross-section, as shown in Figure 8, and establishing line contact with end portion 508 for guiding contact therewith with minimum of friction. The cylindrical end portion 512 of valve member 486 fits snugly into a cylindrical recess 514 formed in the end of end portion 508 and is secured to movable member 504 by a screw 516 which passes through an aperture interconnecting recesses 506 and 514, the head of screw 516 being disposed within recess 506 and being threadedly engaged with the cylindrical portion 512 of the valve member 486.

A spring retainer 518 is secured within the recess 506 between the head of screw 516 and the end wall 520 of recess 506. The pressure responsive device is pre-loaded by a compression spring 522 which abuts at one end against the retainer 518 and at its opposite ends against a retainer 524 mounted upon an adjusting screw 526. A cup shaped member 528, either suitably fixed to the housing member 494 as by silver soldering or integral with member 494, is threadedly engaged by adjusting screw 526 whereby the initial compression of spring 522 may be varied by rotation of screw 526. A cap 530 is also threadedly engaged with screw 526 to form a lock nut.

As may be seen by reference to Figure 10 a plurality of notches 532 are formed through plate 496 around the aperture 510 so that oil from pressure chamber 464 may pass into the chamber within the bellows 500. Aligned bores 534 and 536 formed respectively through the side walls of members 404 and 494 permit flow of oil from the outlet chamber recess 406 into the chamber 492 surrounding the exterior of the bellows 500 within the housing 494. By this construction bellows 500 is subjected externally to the pressure at the outlet side of the variable orifice defined by the coaction of aperture 416 through end wall 414 and the V-shaped notch 420 on valve member 418, this pressure being communicated through aligned bores 534 and 536 into the chamber 492. The pressure at the inlet side of the orifice is communicated through aligned bores 460 and 462, chamber 464, notches 532 to the interior of bellows 500. Spring 522 is compressed by the adjustment of screw 526 to a predetermined value so that a predetermined pressure differential must exist across the orifice before the valve member 486 will open to permit flow to the return outlet 308. As will be noted from Figure 8, the maximum diameter of the head upon which valve face 488 is formed is slightly smaller than the maximum diameter of the portion of valve member 486 upon which valve face 490 is formed. This produces a semi-balanced valve structure. The optimum relative size of these portions is dependent upon the spring rate of spring 522. By this structure, the effect of variations in pressure differential across the waste gate is eliminated.

The general principle of operation of this valve is the same as that of the constant flow valve disclosed in Figure 5 but is however of an improved construction in that the valve 486 actuated by the pressure responsive device is of a semi-balanced type whereby the effect of back pressure from the return outlet 308 or differential pressure changes between outlet 306 and return outlet 308 is eliminated and because of the improved construction of the variable orifice by which flow is maintained through a sharp edge orifice for all positions of the control valve member 418 to thus reduce to a minimum the effect of fluid friction and viscosity variation. Further, in this construction, the orifice remains substantially of the same shape for all adjusted positions of the valve member 418 rather than varying from a circular to a thin annular orifice as in the embodiment of Figure 5.

This invention therefore provides a novel oil supply system wherein preheated oil is delivered to the atomizing nozzle of the burner immediately upon initiation of burner operation and wherein a constant flow of oil for a given intake valve setting is maintained despite the effect of many undesirable and variable impediments to normal flow.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fuel supply system including controls for regulating the flow of preheated fuel to a fuel injector assembly of a fluid fuel burner comprising a supply conduit connecting the fuel injector to a source of preheated fuel, a return conduit for returning fuel to the source for reheating, a throttle valve in said supply conduit for regulating the quantity of fuel flow to said injector assembly, a by-pass interconnecting said return to said supply conduit upstream of said throttle valve, means controlling said throttle valve for varying the rate of flow, and a relief valve upstream of said throttle valve, a fluid pressure responsive device controlled by pressure derived from said supply conduit and connected to actuate said relief valve in accordance therewith, and a recirculating valve assembly in said fuel injector assembly formed with passages connecting said supply conduit to said return conduit and to the nozzle of said fuel injector assembly and having means therein operable to direct fuel flow therethrough either to said return conduit or to said injector nozzle.

2. A fuel supply system including controls for regulating the flow of preheated fuel to a fuel injector assembly of a fluid fuel burner comprising a supply conduit connecting the fuel injector to a source of preheated fuel, a return conduit for returning fuel to the source for preheating, a valve in said supply conduit for regulating the quantity of fuel flow to said injector assembly, and a fuel recirculating valve assembly in said fuel injector assembly formed with unrestricted passages connecting said supply conduit to said return conduit and to the nozzle of said fuel injector assembly and having a fluid motor actuated valve therein operative alternately to direct fuel flow therethrough either to said return conduit or to said injector nozzle.

3. A fuel supply system including controls for regulating the flow of preheated fuel to a fuel injector assembly of a fluid fuel burner comprising a supply conduit connecting the fuel injector to a source of preheated fuel, a return conduit for returning fuel to the source for reheating, said fluid fuel injector assembly including a fuel recirculating valve adapter comprising body structure formed with a fuel inlet and first and second fuel outlets interconnected therewith internally of said body by passages, said first fuel outlet being connected to the nozzle of said injector assembly, said inlet and said second outlet being connected respectively to the supply and return conduits, and said adapter having means therein operative substantially independently of fuel supply pressure for alternatively closing the internal connecting passages between said fuel inlet and one or the other of said fuel outlets, and a throttle valve in said supply conduit for regulating the quantity of fuel flow to said injector assembly.

4. A fluid fuel circulating system for supplying fuel to a fuel injector assembly at a controllable constant rate, comprising a constant flow valve having body structure formed with an inlet and an outlet interconnected by a fuel passage, means in said fuel passage defining an orifice of variable size, a fuel return outlet interconnected to said fuel inlet by a return passage, and a differential pressure responsive device connected across said orifice and adapted to vary fluid flow through said return passage in response to changes in pressure differential across said orifice, means for supplying fuel to the fuel inlet of said constant flow valve, means connected to said return outlet of said constant flow valve for returning fuel to a fuel supply, and an atomizing fuel injector assembly, including an oil recirculating valve having body structure formed with a fuel inlet port connected to said constant flow valve fuel outlet, a return outlet port connected to return fuel to said fuel supply, and a second fuel outlet port connected to a nozzle of said injector assembly, fuel passages within said oil recirculating valve body structure interconnecting said fuel inlet port with said fuel outlet ports, and valve means operable to close the passage from said inlet port to one or the other of said outlet ports.

5. In a liquid fuel injection system, and an injector assembly having an atomizing fluid tube and a liquid fuel conduit, a fuel atomizing nozzle assembly connected to said conduit and said tube at one end, a fuel recirculating fitting for connection to said tube and said conduit at their ends opposite said nozzle assembly and having body structure formed with interconnected atomizing fluid inlet and outlet openings, a fuel inlet, first and second fuel outlets connected to said fuel inlet by passages within said body structure, said atomizing fluid outlet being connected to said fuel conduit and second fuel outlet being connected to a fuel return pipe, valve structure within said body structure having two operative positions and adapted in one position to permit substantially free flow of fuel from said fuel inlet into one of said fuel outlets and in the other of said positions to direct fuel from said inlet to the other of said fuel outlets, and means including a fluid motor selectively shifting said valve structure.

6. In a fluid fuel injector assembly, an atomizing fluid tube and a fuel conduit both of substantial length, a fuel atomizing nozzle assembly connected to said conduit and said tube at one end, a fuel recirculating fitting connected to said tube and said conduit at their ends opposite said nozzle assembly and having body structure formed with interconnected atomizing fluid inlet and outlet openings, a fuel inlet, first and second fuel outlets connected to said fuel inlet by passages within said body structure, said atomizing fluid outlet being connected to said tube, said first fuel outlet being connected to said fuel conduit, and said second fuel outlet being adapted for connection to a fuel return pipe, valve structure within said body structure selectively actuated to direct fuel from said fuel inlet to one or the other of said fuel outlets and comprising valve seats formed within said fuel passages between said fuel inlet and each of said fuel outlets, a valve assembly mounted for movement within said body relative to said valve seats to engage one or the other of said valve seats alternatively, and means for selectively shifting said valve assembly between its alternative positions.

7. In a liquid fuel injection system for a burner, a fuel recirculating atomizing injector having a discharge orifice, a fuel inlet, a fuel return outlet, and selectively actuated means for directing fuel from said inlet alternatively to said orifice or return outlet, and means for controlling the quantity of fuel flow through said supply channel to said fuel inlet comprising a selectively settable variable fuel metering orifice in said fuel supply channel, a by-pass channel interconnecting said supply and return channels between a point in said supply channel up-stream of said selectively settable metering orifice and a point in said return channel downstream of said injector, a pressure responsive device controlled by a pressure derived from said supply channel adjacent said orifice for controlling the rate of fuel flow through said by-pass channel.

8. In a fuel supply system including a liquid fuel supply duct and a liquid fuel return duct, an atomizing oil burner nozzle assembly comprising an atomizing nozzle, an oil and atomizing fluid introduction fitting, and oil and atomizing fluid conduits connecting the nozzle and fitting, a valve in said fitting normally closing said oil conduit and directing circulation of oil through said fitting between said supply and return ducts, selectively actuated means for shifting said valve to open said oil conduit and prevent circulation of oil to said return connection, a by-pass interconnecting said supply and return ducts between a point in said supply duct upstream of said fitting and a point in said return duct downstream of said fitting, a by-pass valve for controlling the flow of fuel through said by-pass and a pressure responsive device controlled by pressure derived by said supply duct and operative to control the actuation of said by-pass valve to thereby regulate the flow of fuel to said fitting.

9. In a liquid fuel injection system for a burner, a fuel recirculating atomizing injector having a fuel inlet, a discharge orifice, a fuel return outlet and selectively actuate means for directing fuel alternatively to said orifice or return outlet from said inlet, a fuel supply channel and a fuel return channel connected respectively to said injector fuel inlet and said injector fuel outlet, and means for controlling the quantity of fuel flow through supply channel to said injector fuel inlet comprising a selectively settable variable fuel metering orifice, a by-pass channel interconnecting said supply and return channels between a point in said supply channel upstream of said selectively settable metering orifice and a point in said return channel downstream of said injector, a valve in the said by-pass channel for controlling fuel flow through said by-pass channel, a pressure responsive device controlled by pressure from said supply channel adjacent said orifice for controlling the position of said valve in said by-pass channel.

10. In a liquid fuel injection system for a burner, fuel recirculating atomizing injector having a discharge orifice, a fuel inlet, a fuel return outlet and selectively actuate means for directing fuel alternatively through said orifice or return outlet from said inlet; a fuel supply channel and a fuel return channel connected respectively to said fuel inlet and to said fuel return outlet, and means for controlling the quantity of fuel flow through said supply duct to said fuel inlet comprising a selectively settable variable fuel metering orifice, a by-pass channel interconnecting said supply and return channels between a point in said supply channel upstream of said selectively settable metering orifice and a point in said return duct downstream of said injector, a pressure responsive device differentially controlled through pressure connections to the upstream and downstream side of said orifice for controlling the flow of fuel through said by-pass channel in accordance with the rate of flow of fuel through said orifice.

11. In a fluid fuel injector assembly, a fuel recirculating adapter having body structure formed with a fuel inlet and first and second fuel outlets interconnected therewith by internal passages formed in said body structure, said first fuel outlet being adapted for connection to a fuel nozzle of the injector assembly, said second fuel outlet being adapted for connection to a fuel return conduit, and said fuel inlet being adapted for connection to a fuel supply conduit, valve structure within said fuel passages operable to permit passage of fuel from said inlet to one or the other of said outlets and comprising oppositely outwardly facing valve seats formed within said fuel passages between said fuel inlet and each of said fuel outlets, and a pair of rigidly connected oppositely inwardly facing valve members mounted for conjoint movement within said body relative to said valve seat to engage one or the other of said valve seats, a selectively actuate fluid motor for shifting said valve members between their two positions.

12. In a fuel supply system for a liquid fuel burner, a burner nozzle, a fuel supply line connected to said nozzle, a first valve assembly in said supply line comprising means for maintaining a constant flow of fuel toward said nozzle, a fuel return line, a first conduit for discharging fuel from said first valve assembly into said return line, a second valve assembly connected between said fuel supply line and said nozzle, a second conduit for discharging fuel from said second valve assembly into said return line, and a valve in said second valve assembly movable between a position where it connects the fuel supply line with the nozzle to a position where it connects the fuel supply line to said second conduit.

13. In a fuel supply system, a fuel injector assembly comprising a fuel atomizing nozzle, a fuel recirculating control valve, and concentrically arranged fuel and atomizing fluid tubes interconnecting said recirculating valve and said nozzle, said recirculating valve comprising a body having a fuel inlet passage branching into a nozzle supply passage and a return outlet passage, said fuel tube being connected to said nozzle supply passage, a valve actuatable to close one or the other of said branch passages and normally urged to close said nozzle supply passage, an actuator in said body operative substantially independently of fuel supply pressure for actuating said valve, a passage in said body adapted at one end for connection to a source of heated atomizing fluid, and connected at its other end to said atomizing fluid tube, a supply conduit connecting said fuel inlet passage to a source of heated fuel, a return conduit connected to said return outlet passage for returning fuel to the source, and means in said supply conduit for regulating the rate of flow of fuel to said fuel injector assembly.

14. A liquid fuel system for a fuel injector assembly comprising a fuel preheater having an inlet and outlet for fuel, conduit means connecting the fuel preheater inlet to a source of fuel, a supply conduit connecting the fuel injector to the fuel preheater outlet, a return conduit for returning fuel to said conduit means at a point between the source of fuel and the preheater inlet, fuel recirculating valve means formed with passages connecting said supply conduit to said return conduit and to the nozzle of said fuel injector assembly and having means therein operable to direct fuel flow therethrough either to said return conduit or to said injector nozzle, and a valve in said supply conduit upstream of said recirculating valve means for regulating the rate of fuel flow thereto.

15. A fuel recirculating control valve for a fuel supply system comprising a valve body having a fuel inlet passage branching into a nozzle supply passage and a return outlet passage; a valve member actuatable to close one or the other of said branch passages and normally urged to close one of said passages; an actuator in said body operative substantially independently of fuel supply pressure for actuating said valve; a chamber in said body adapted at one end for communication with said nozzle supply passage and adapted at a point remote from said end for connection to an atomizing fluid tube; a second chamber in said body adapted at one end for communication with said return outlet passage and adapted at a point remote from said one end for connection to a fuel return conduit.

16. The fuel recirculating control valve of claim 15 wherein said actuator comprises a stem connected to one end of said valve member and extending outwardly through an opening in said body, and closure means for said opening cooperating with said stem to prevent fluid leakage along said stem and through said opening.

17. The fuel recirculating control valve of claim 16 wherein said stem beyond said opening is provided with actuating means responsive to a condition external of said recirculating valve for actuating said stem to move said valve member to open said other passage and close said one of said passages.

References Cited in the file of this patent
UNITED STATES PATENTS

| | | |
|---|---|---|
| 1,644,372 | Gray | Oct. 4, 1927 |
| 1,654,614 | Smith | Jan. 3, 1928 |
| 1,743,245 | Smith | Jan. 14, 1930 |
| 1,980,478 | Frentzel | Nov. 13, 1934 |
| 1,985,279 | Buller | Dec. 25, 1934 |
| 2,070,411 | Powers | Feb. 9, 1937 |
| 2,199,454 | Andler | May 7, 1940 |
| 2,244,686 | Garrison | June 10, 1941 |
| 2,436,815 | Lum | Mar. 2, 1948 |
| 2,484,920 | Witherell | Oct. 18, 1949 |
| 2,489,823 | Senninger | Nov. 29, 1949 |
| 2,668,585 | Oestrich | Feb. 9, 1954 |